(12) United States Patent
Park et al.

(10) Patent No.: US 6,344,148 B1
(45) Date of Patent: Feb. 5, 2002

(54) METHOD FOR ALIGNING OPTICAL DEVICES WITH SUBSTRATE

(75) Inventors: Soo-Jin Park; Ki-Tae Jeong; Tae-Seok Suh; Young-Bok Choi; Sang-Pil Han, all of Taejon (KR)

(73) Assignee: Korea Telecom, Seoul (KR)

( * ) Notice: Subject to any disclaimer, the term of this patent is extended or adjusted under 35 U.S.C. 154(b) by 0 days.

(21) Appl. No.: 09/434,936

(22) Filed: Nov. 5, 1999

(30) Foreign Application Priority Data

Nov. 5, 1998 (KR) .............................................. 98-47296

(51) Int. Cl.[7] ................................................ H01P 11/00
(52) U.S. Cl. ................................ 216/2; 216/24; 216/39; 216/57
(58) Field of Search ................................ 216/2, 24, 39, 216/40, 41, 57, 79, 99; 385/14, 52

(56) References Cited

U.S. PATENT DOCUMENTS 5,342,478 A * 8/1994 Welbourn .................... 156/643
5,499,732 A * 3/1996 Nishimoto ................... 216/24

FOREIGN PATENT DOCUMENTS

EP          0762162 A1 * 12/1997  ............ G02B/6/30

* cited by examiner

*Primary Examiner*—Randy Gulakowski
*Assistant Examiner*—Allan Olsen
(74) *Attorney, Agent, or Firm*—Staas & Halsey, LLP

(57) ABSTRACT

An easy method proposes a passive alignment by using an alignment mark. That is, V-shaped grooves are utilized as alignment marks in place of a metal pattern of the prior art in observing an optical contrast. Also, in order to adjust a height of an optical device, the support made of a metal is formed in the conventional method, whereas in the present invention a height of an optical device is adjusted by etching the silicon substrate and clamped through the use of solder bumps formed in the V-shaped grooves. And also, in this invention, it is possible that V-shaped grooves can be facilely formed on a non-planarized substrate by using a method of burying a mask material during the formation of the V-shaped grooves. By applying the above principle, the present invention proposes a process capable of passive aligning an optical device, a planar lightwave circuit (PLC) and an optical fiber, simultaneously.

4 Claims, 15 Drawing Sheets

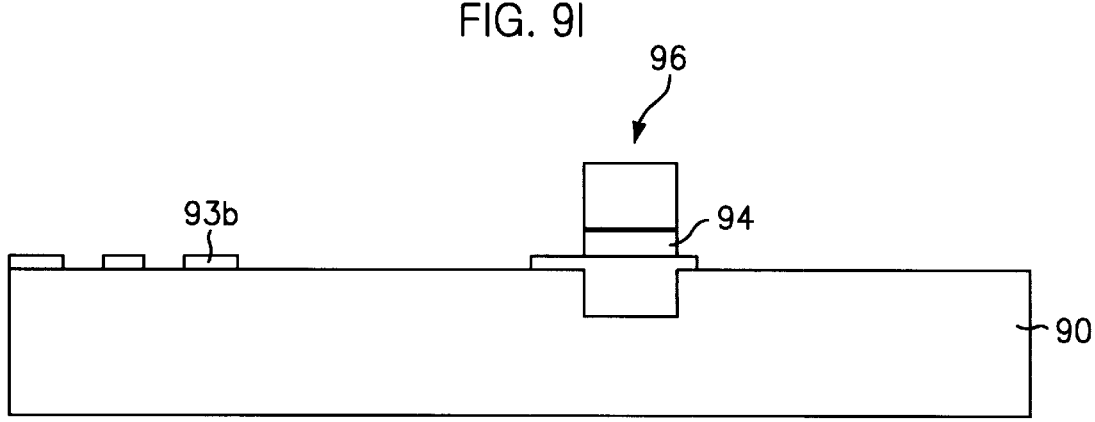
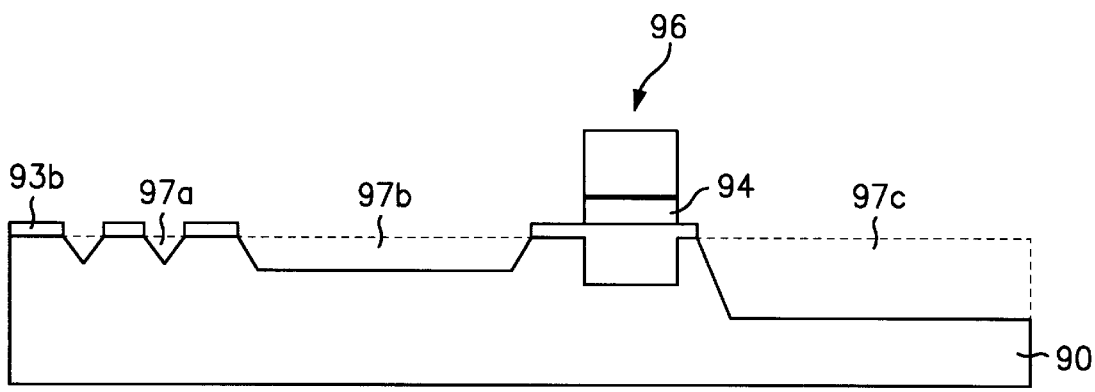
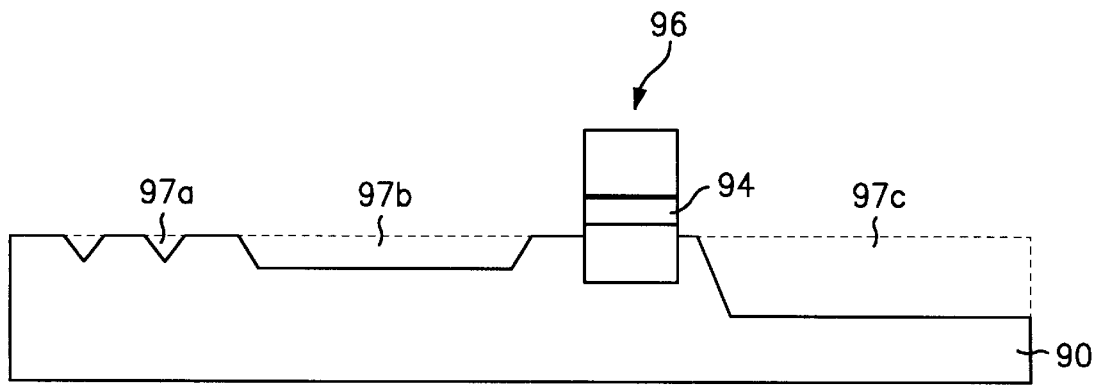

METHOD FOR ALIGNING OPTICAL DEVICES WITH SUBSTRATE

FIELD OF THE INVENTION

The present invention relates to a semiconductor technology; and, more particularly, to a method for aligning an optical device with an optical fiber and a planar lightwave circuit (PLC) by using a passive alignment method.

DESCRIPTION OF THE PRIOR ART

There is a need for an exact alignment between optical axes to get the maximum optical coupling between optical devices such as an optical fiber and a laser diode (LD) Conventionally, when the laser diode is aligned with an optical device, it is required that the tolerance of the optical alignment accuracy is within about 1 μm. In general, the alignment method is classified into an active alignment and a passive alignment. The active alignment is a method of achieving an optimum alignment by controlling the position of the optical waveguide and the LD based on the intensity observed with turning on the LD. This method can provide an optimum optical alignment easily, however, it is expensive to implement due to its complex process. Whereas the passive alignment is a method of carrying out the alignment of the optical axes with turning off the LD. In this method, it is difficult to obtain an optimum alignment of the optical axes, however, it is cost-effective due to its simple structure.

The passive alignment method is further classified into three methods as follows:

The first is a mechanical alignment method that optical devices are mounted on a silicon substrate after cutting grooves exactly to have the optical devices mounted on the silicon substrate and to fabricate the optical devices in an exact dimension. In this method, it is difficult that the optical devices and the silicon substrate are fabricated to have the tolerance of the optical alignment accuracy within about 1 μm.

The second is a flip-chip bonding method through the use of the surface tension of solder bumps that the solder bumps on the silicon substrate and solder pads on the optical device are exactly formed on their corresponding positions, respectively, by a conventional photolithography method. After the solder pads are aligned with the solder bumps, and then they are heated, the solder bumps are reflowed to be changed into the most stable shape and have the optical devices exactly positioned. However, in this method the reflow condition of the solder bumps is strict and it is required to prevent the oxidation of the solder.

Finally, the third is a mask alignment method that can be referred as the prototype of this invention, which alignment marks are formed on the silicon substrate and the optical devices and the optical devices are aligned with the substrate by using the alignment marks, this method will be described in detail hereinbelow.

FIG. 1a is an exemplary cross sectional view illustrating a method of connecting a laser diode to an optical fiber by using a conventional mark alignment method, FIG. 1b represents a plan view of a laser diode and FIG. 1c is a plan view of a substrate.

Referring to the drawings, a silicon wafer 10 is generally used as a substrate and a V-shaped groove 11 is used for clamping an optical fiber. The V-shaped groove 11 is obtained by wet-etching a silicon single crystal in KOH solution. The silicon single crystal has a different etching rate according to its crystalline plane, that is, since an etching ratio between a crystalline plane 111 and the other crystalline plane is in the order of 1/100, it is possible to obtain the V-shaped groove with a predetermined angle, e.g., 54.7°, after the etching is carried out for enough period of time, wherein the predetermined angle is an angle between the surface of the substrate and the surface of the V-shaped groove. Once the V-shaped groove 11 is formed, in case that it is still immersed in the KOH solution, the angle of the V-shaped groove 11 is hardly changed due to its negligible etching amount.

As shown in FIG. 2a, a silicon wafer 20 of crystalline plane 100 is generally used, after being etched by KOH solution, to obtain an angle of 54.7° between the surface of the silicon wafer 20 and an exposed crystalline plane 100. Typically, a process for forming the V-shaped grooves A, B is as follows: first, depositing on top of the silicon wafer 20 a material such as a silicon nitride ($Si_3N_4$) layer and a silica layer ($SiO_2$) and the like which does not react with KOH solution; selectively removing portions of the material where the V-shaped grooves are to be formed, to thereby form a V-shaped etching window; and immersing the silicon wafer 20 into KOH solution, thereby forming the V-shaped grooves A, B under the removed portions of the material. At this time, the width and the depth of the V-shaped grooves A, B are determined by the width of the V-shaped etching window. After two windows are formed on the silicon wafer 20, each window having a different width, and by etching the silicon wafer 20 in KOH solution, the V-shaped grooves A, B in FIG. 2a can be obtained, simultaneously. In this case, the V-shaped groove B of the small window width is first formed and even though it is still immersed into KOH solution until the V-shaped groove A of the large window width is formed, the V-shaped groove B is not being etched further. Therefore, a width and a depth of a V-shaped groove can be obtained by controlling a window width. Thereafter, as shown in FIG. 2b, an optical fiber 22 can be exactly aligned by positioning it on a V-shaped groove 23.

Referring back to FIGS. 1a to 1c, there are alignment marks 13a, 13b for defining a position of an optical device such as a LD 12. After cross-shaped marks 13a, 13b are formed on the silicon substrate 10 and the LD 12, respectively, these marks 13a, 13b are aligned by using an optical apparatus such as a microscope to fix the LD 12. FIG. 3 is a view exemplifying a method for aligning an optical device 31 with a silicon substrate 30 by using an infrared ray, which has low attenuation in a substrate 30 and optical device 31. The reference numerals 32 and 33 represent the alignment marks and the objective lens of the microscope, respectively.

Further, a plurality of solder bumps 14 and metal pads 7 can be provided on an upper surface of the silicon wafer 10 to attach the LD 12 to the silicon wafer 10 and to apply electrical signals to the LD 12. As shown in FIG. 1a, there is a under bump metallurgy (UBM) 15 for bonding the solder bump 14 to the silicon wafer 10 and a solder dam 16 made of a material such as silicon nitride which is non-adhesive to the solder bump 14. The LD 12 is electrically connected to the metal line 17 through the use of the solder bump 14. Also, a Au support 8 is formed to match a height of a core 18 of the LD 12 to that of a core 9 of the optical fiber 19.

As described hereinabove, the passive alignment method for aligning an optical device and optical fiber and the passive alignment for aligning an optical device and a PLC is well known, however, the passive alignment of three devices, e.g., the laser diode, the PLC and the optical fiber, is very difficult.

On the other hand, the prior art method employs a metal layer to obtain an optical contrast for the alignment mark. As shown in FIG. 4, since a structure of silicon PLC 41 based on a silicon substrate 40 has a non-planarized surface due to a step caused by its structure, it is impossible to obtain a planarized surface by spin-coating a thin photoresist on top of the non-planarized surface. Therefore, it is required that a very thick photoresist 42 should be coated on top of the non-planarized surface to obtain a planarized surface of the photoresist 42. Alignment marks 43a are formed by a lift-off method as follows: selectively removing portions of photoresist 42 where the alignment marks 43a are formed; depositing a metal layer 43 on top of the photoresist 42; and removing the photoresist 42.

Since, however, the very thick photoresist 42 is used as a mask in this method, there is a shortcoming in accuracy.

In the conventional method, the formation of V-shaped grooves is as follows: depositing on top of a silicon wafer the mask layer such as a silicon nitride layer which does not react with KOH solution; selectively removing portions of the mask layer where the V-shaped grooves are formed, thereby producing etching widows; and etching the silicon wafer by using KOH solution.

However, in case that the structure has a PLC with a non-planarized surface, since the thickness of the photoresist must be thick enough to pattern the V-shaped grooves, it is very difficult that the V-shaped grooves are exactly formed in place.

SUMMARY OF THE INVENTION

It is, therefore, an object of the present invention to provide a passive alignment method for facilely ensuring an alignment accuracy of optical device without being affected by the non-uniform surface which is formed during the formation of V-shaped grooves for use in aligning an optical fiber with a silicon substrate. Another object of the present invention is to provide a method for assembling an optical device, a planar lightwave circuit (PLC) and an optical fiber by using a passive alignment capable of passive-aligning the optical device, the PLC and the optical fiber, simultaneously.

In accordance with one aspect of the present invention, there is provided a method for aligning optical devices with a silicon substrate by using a passive alignment, the method comprising the steps of: (a) etching a portion of the silicon substrate in a predetermined thickness, wherein a remaining portion of the silicon substrate is used for the formation of a plurality of V-shaped grooves; (b) forming a mask layer on the silicon substrate and planarizing the mask layer; (c) etching back the mask layer to expose the silicon substrate, thereby forming an etching mask pattern for use in the formation of the V-shaped grooves; (d) etching the exposed silicon substrate until a sidewall of the etching mask pattern is open; and (e) wet-etching the silicon substrate by using the etching mask pattern as an etching barrier to thereby forming the V-shaped grooves.

In accordance with another aspect of the present invention, there is a method for aligning an optical device, an optical fiber and a planar lightwave circuit (PLC) with each other by using a passive alignment, the method comprising the steps of: (a) preparing a silicon substrate provided with an alignment mark region, an electrode region and an optical fiber alignment region and etching a remaining portion of the silicon substrate except those regions in a first preset thickness; (b) selectively etching a region of the silicon substrate, on which a lower clad layer of the PLC is formed, in a second preset thickness; (c) forming a silica layer on top of the silicon substrate for forming a lower clad layer of the PLC; (d) etching back the silica layer, thereby forming the lower clad layer by burying the silica layer in the region; (e) forming a core and upper layers of the planar lightwave circuit subsequently and patterning the core and the upper layers into a predetermined pattern, thereby providing the PLC; (f) etching the silicon substrate until a portion of a sidewall of the silica layer buried in the region is exposed; (g) wet-etching the silicon substrate by using the silica layer as an etching barrier to form a first set of V-shaped grooves for serving as an alignment mark, a second set of V-shaped grooves for aligning solder bumps and a third set of V-grooves for aligning the optical fiber; (h) forming solder bumps in the second set of V-grooves; and (i) assembling the optical device and the optical fiber on the silicon substrate.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 5A:
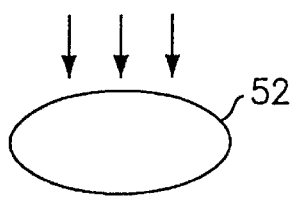
FIGS. 5A and 5B present exemplary views illustrating a principle of forming an optical contrast by utilizing V-shaped grooves as an alignment mark according to the present invention.
Figure 5A:
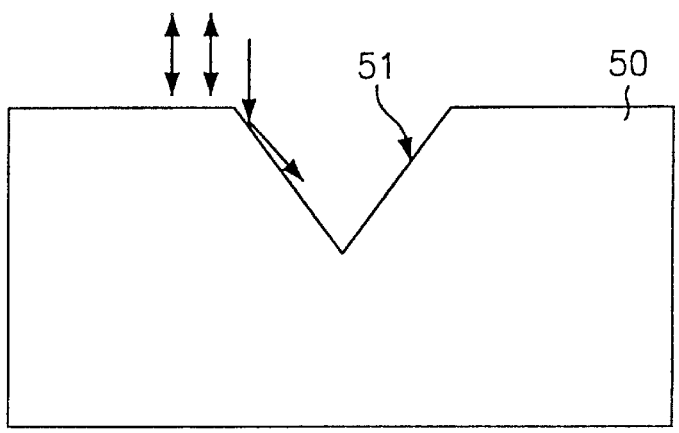
Figure 5B:
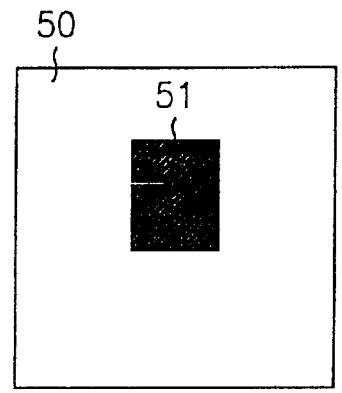

First, in the present invention, a metal pattern used for an optical contrast of alignment marks in the prior art is not used, whereas alignment marks in the form of V-shaped grooves are formed on a silicon substrate, and then they are observed by using a microscope. As shown in FIGS. 5A and 5B, inspecting the V-shaped grooves 51 by using the microscope, a flat surface of the silicon surface 50 is seen bright due to a light reflected therefrom, but positions of the V-shaped grooves are seen dark due to a light deflected therefrom. Also, as described herein above, once the V-shaped grooves 51 is formed, the size and angle of the V-shaped groove 11 can be controlled with accuracy due to very slow etching rate in a crystalline plane. Therefore, if the V-shaped grooves 51 are used as an alignment mark, it is possible that the alignment accuracy improve and the V-shaped grooves for other purpose can be formed simultaneously, which will, in turn, simplify the overall manufacturing process therefor in comparison with the metal pattern used as the alignment marks.

Figure 6A:
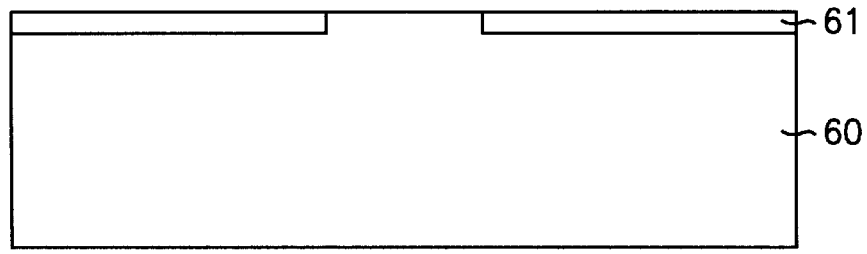
FIGS. 6a to 6c provide exemplary views illustrating a process for forming V-shaped grooves according to the present invention.
Figure 6B:
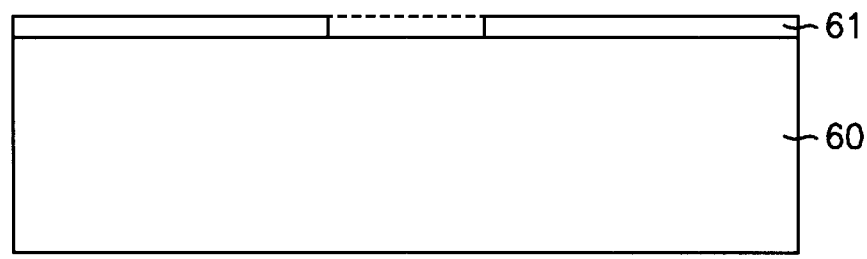
Figure 6C:
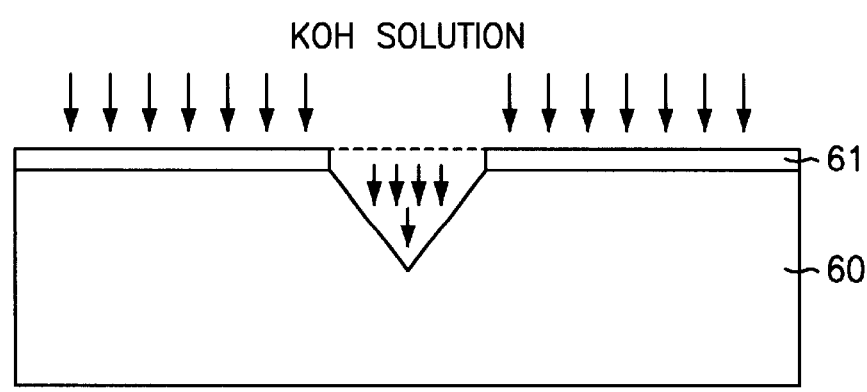

Referring to FIGS. 6a to 6c, a silicon substrate 60 except portions to be used for forming V-shaped grooves is etched in a predetermined thickness, e.g., 4 μm(i.e., a length from bottom of a LD to a core of the LD) in accordance with a preferred embodiment of the present invention. And, a silica layer 61, which is not reacting with KOH solution, is formed to planarize top thereof and the silicon substrate 60 is etched back until portions of the silicon substrate 60 where the V-shaped grooves are formed are exposed, as shown in FIG. 6a. And then the exposed silicon substrate 60 is dry-etched in the thickness of 4 μm to expose a sidewall of the silica layer 61, as shown in FIG. 6b. Thereafter, the silicon substrate 60 is wet-etched by using KOH solution to form the V-shaped grooves in place. This method has an advantage that the V-shaped grooves can be formed at their exact position for the non-planarized surface shown in FIGS. 5A and B.

Figure 1A:
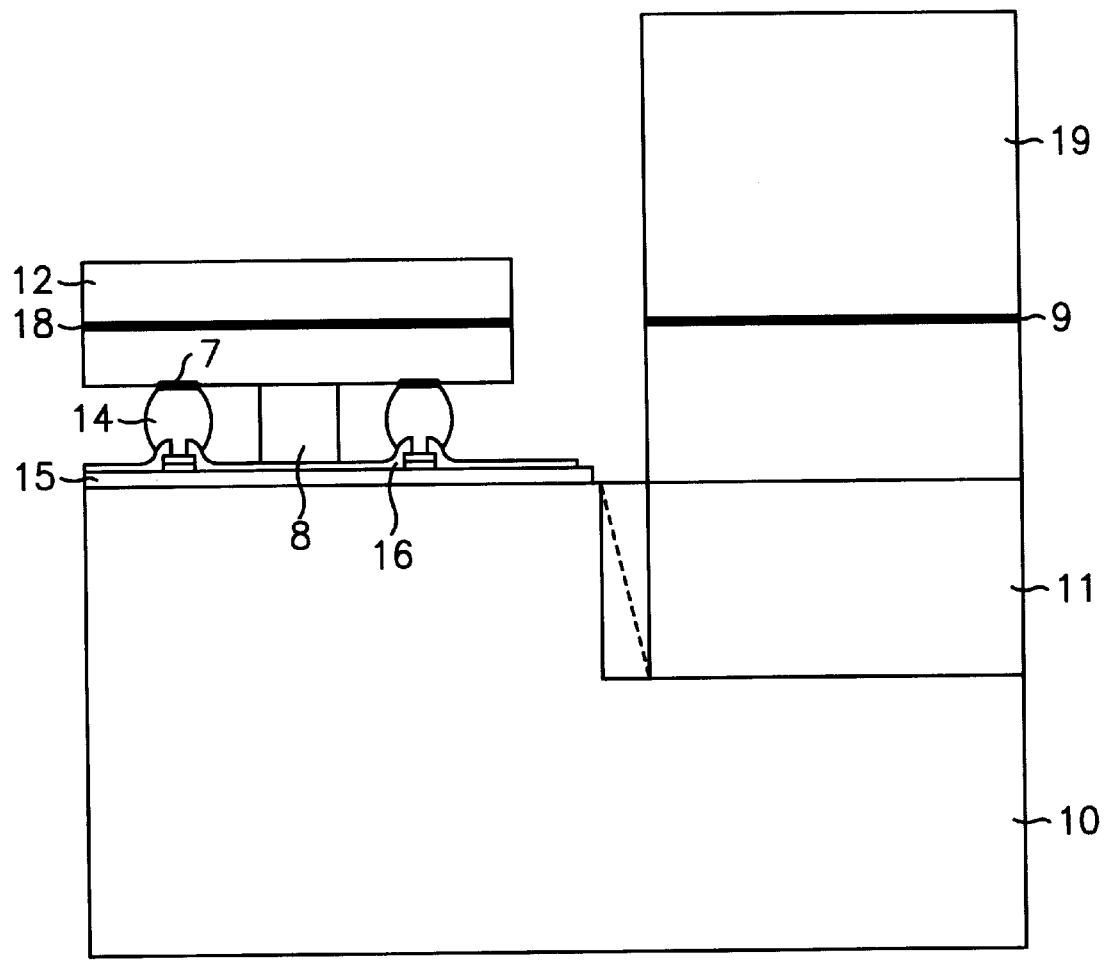
FIG. 1a is a cross sectional view illustrating a method of connecting a laser diode to an optical fiber by using a conventional mark alignment method.
Figure 1B:
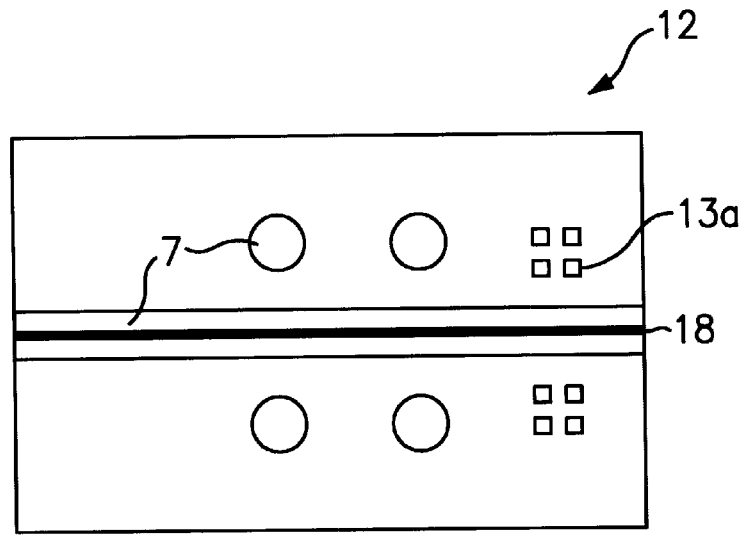
FIGS. 1b and 1c are plan views of the laser diode and the substrate shown in FIG. 1a, respectively.
Figure 1C:
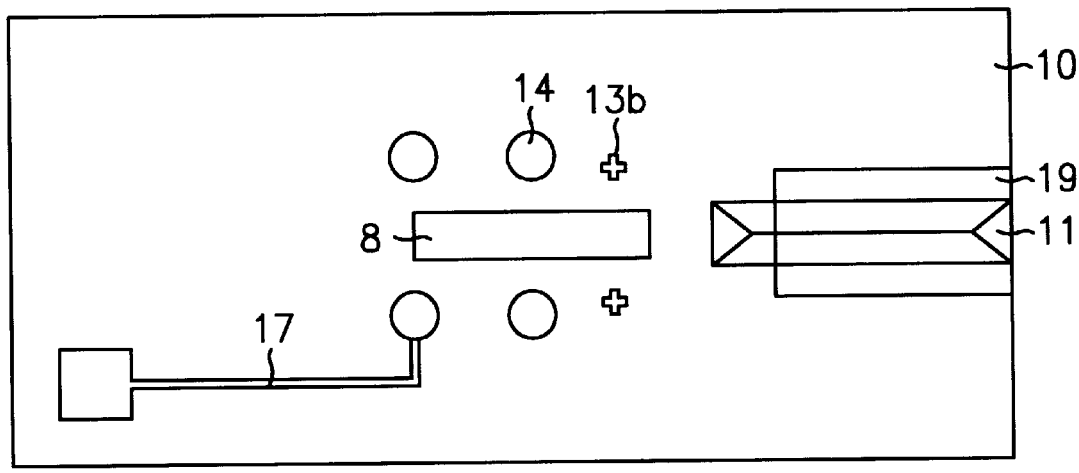
Figure 2A:
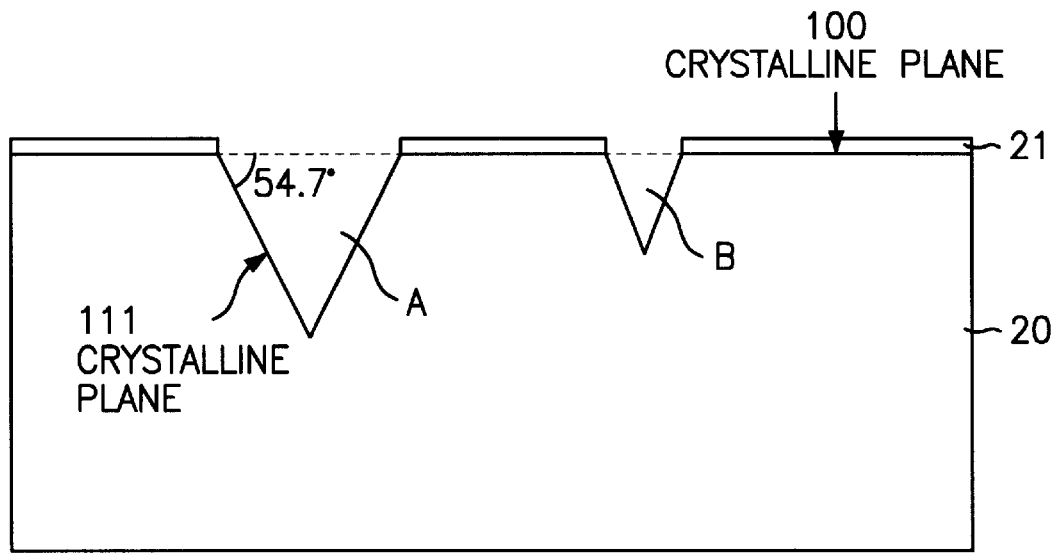
FIGS. 2a and 2b show cross sectional views illustrating a conventional process for forming V-shaped grooves.
Figure 2B:
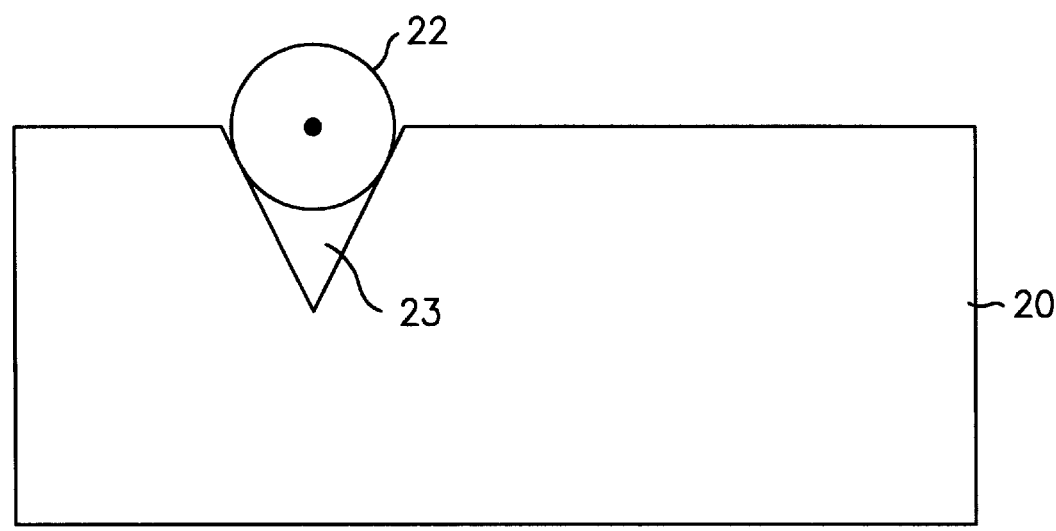
Figure 3:
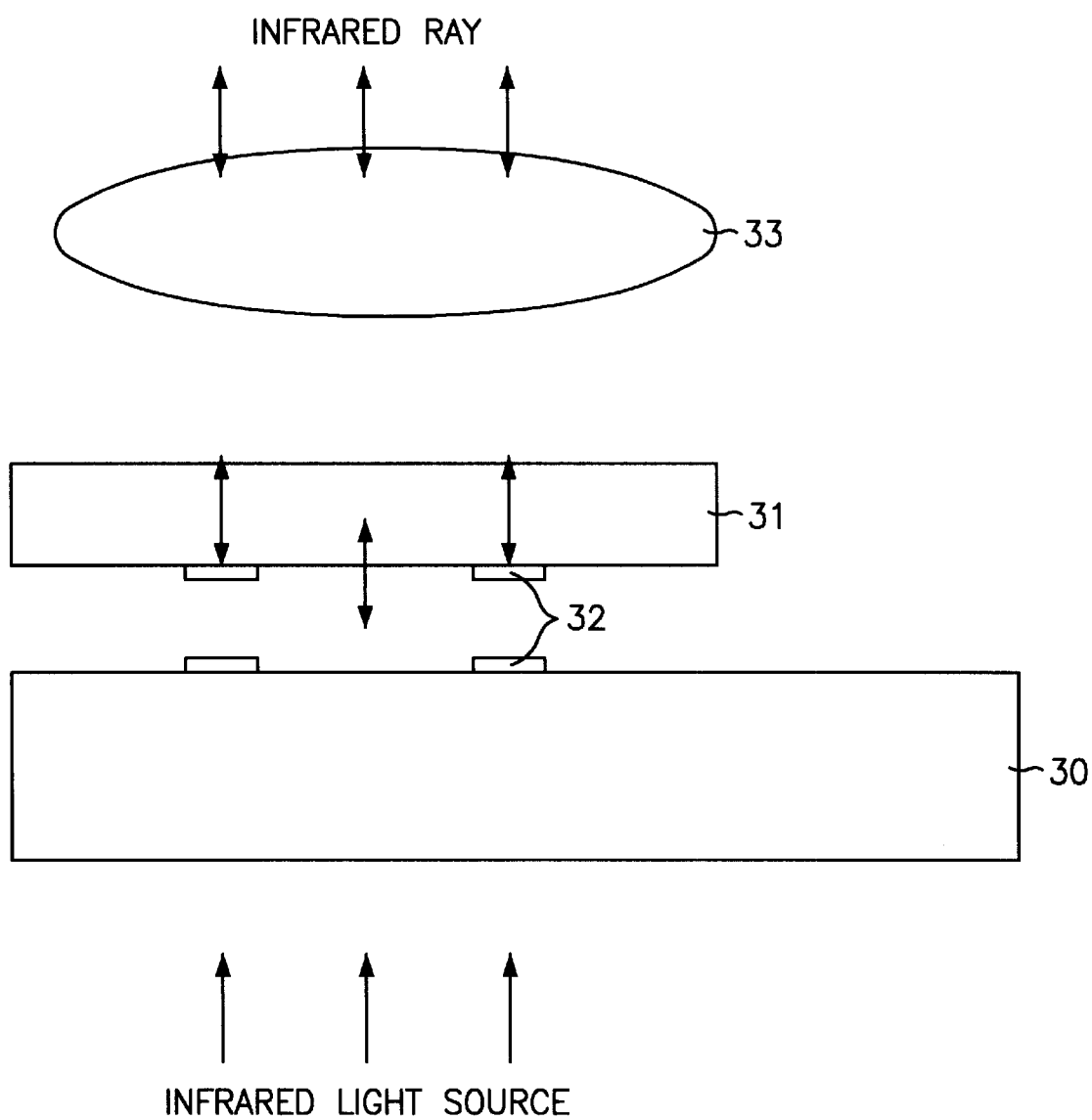
FIG. 3 represents an exemplary view showing a conventional method for aligning a laser diode with a substrate by using an infrared ray.
Figure 4:
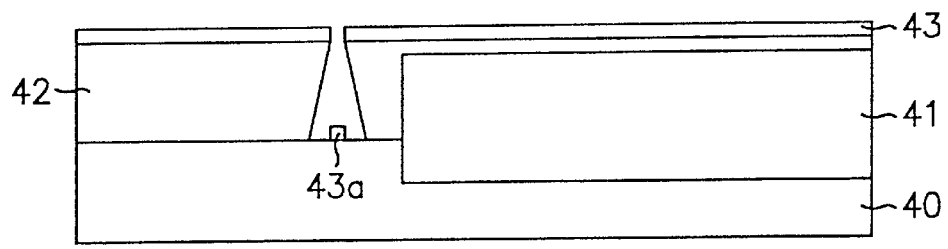
FIG. 4 depicts an exemplary view illustrating a conventional process for forming alignment marks.
Figure 7:
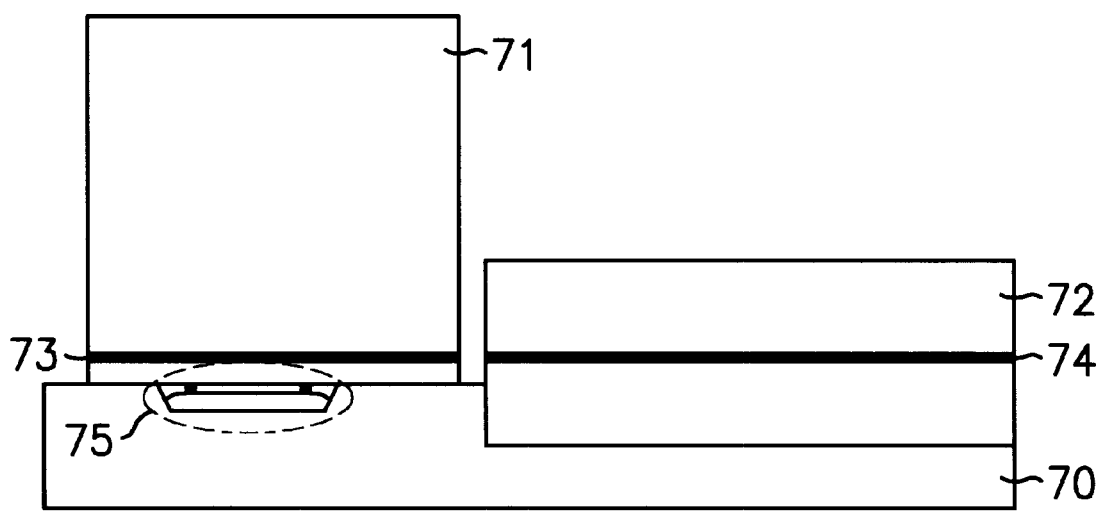
FIG. 7 is an exemplary view of laser diode mounting process according to the present invention.
Figure 8A:
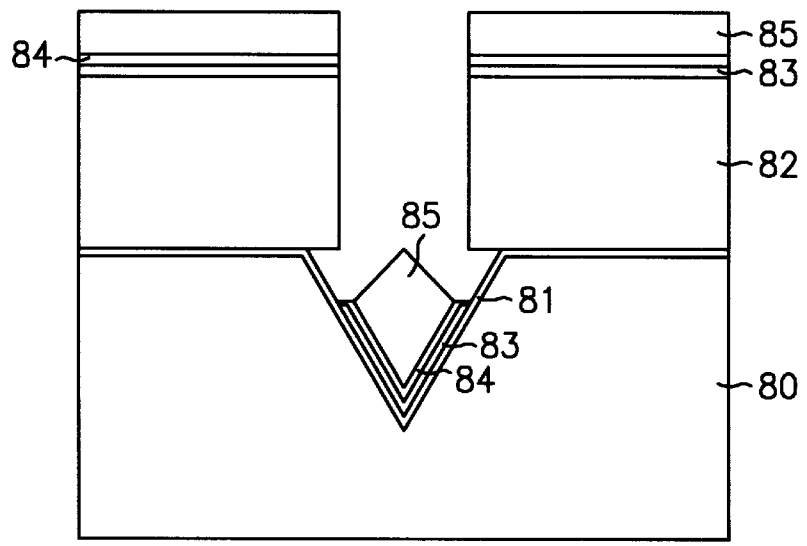
FIGS. 8a to 8c illustrate exemplary views of forming electrodes and solder parts shown in FIG. 7.
Figure 8B:
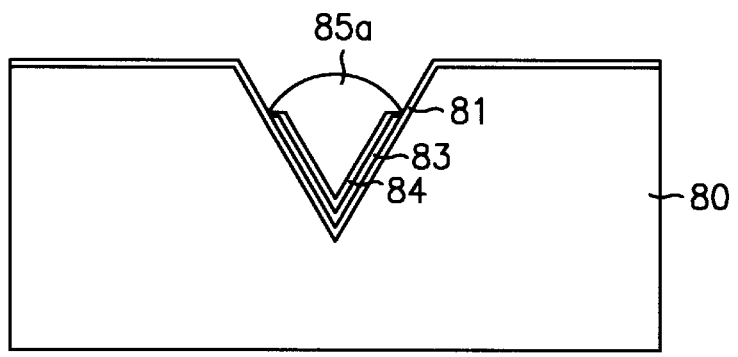
Figure 8C:
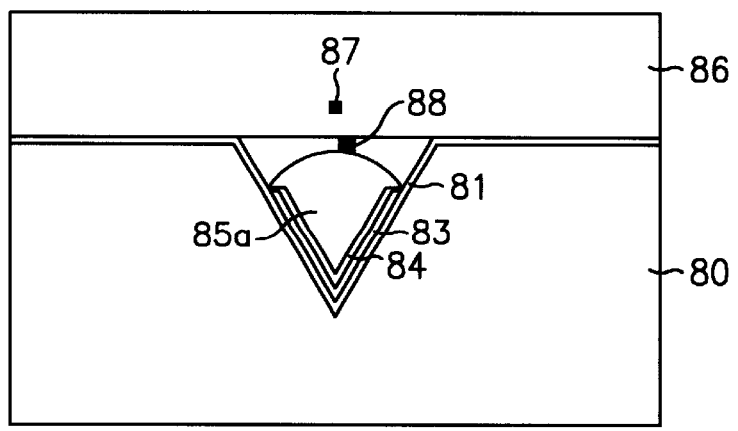

In addition, in order to adjust a height of the LD, the support made of coating a metal such as Au is formed in the conventional method as shown in FIGS. 1a to 1c, whereas in the present invention a height of an optical device such as a LD 71 is adjusted by etching the silicon substrate and clamped through the use of solder bump formed in V-shaped grooves. FIG. 7 is an exemplary view showing an alignment between a core 73 of the LD 71 and a core 74 of an optical fiber 72 by adjusting a height of the core 73 of the LD 71 with etching a portion of the silicon substrate 70 where the solder bump is formed, in the form of V-shaped. FIGS. 8a to 8c are exemplary views showing the processes for forming electrodes and the solder 75 in FIG. 7. After forming V-shaped grooves on a silicon substrate 80, a non-adhesive layer such as a silicon nitride layer 81 which has not affinity with a solder metal such as Pb—Sn, Au—Sn and the like is coated. And then a photoresist pattern 82 for the solder is formed, a Ti layer 83 for improving the solderability between the silicon nitride layer 81 and the solder metal, a Au layer 84 as a protection layer is deposited to ensure conductivity and to prevent the oxidation of the Ti layer 83 and the solder metal 85 is deposited, subsequently, as shown in FIG. 8a. Thereafter, removing the photoresist pattern 82 and reflowing the solder metal 85 with heating, the structure of the solder bump 85a is formed as shown in FIG. 8b. FIG. 8c shows a cross section of the LD 86 mounted on the silicon substrate 80, wherein the reference numerals 86, 87 and 88 represent the LD, the core of the LD and the electrode of the LD, respectively.

Hereinafter, a preferred embodiment of the present invention will be introduced in order that those skilled in the art readily implement the present invention.

Figure 9A:
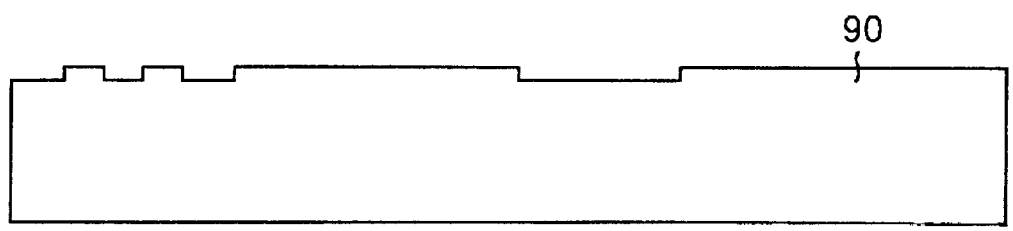
FIGS. 9a to 9p provide schematic cross sectional views illustrating a method for a simultaneous passive alignment of a laser diode, a planar lightwave circuit and an optical fiber in accordance with the principle of the present invention.
Figure 9B:
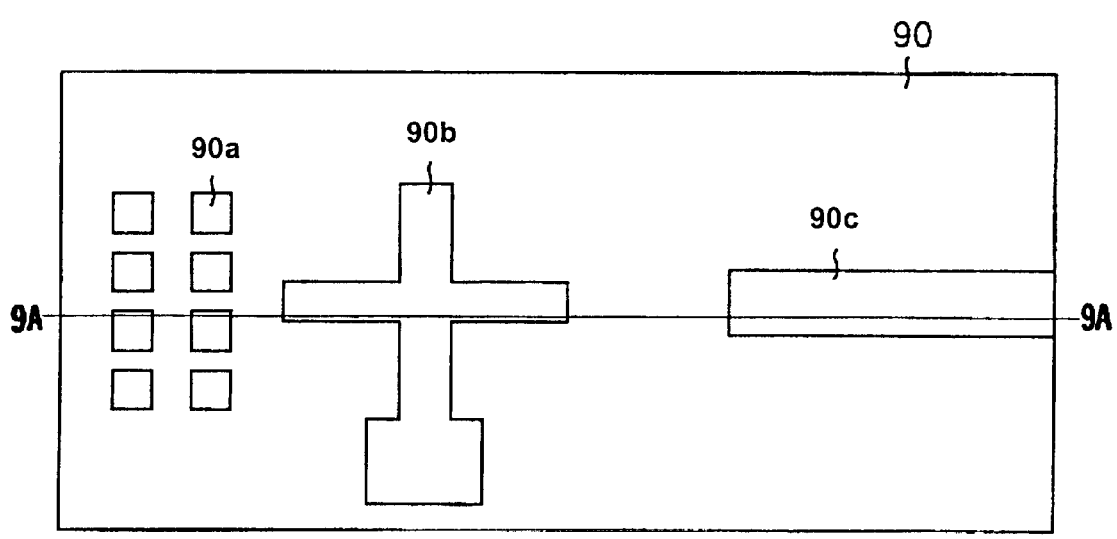
Figure 9C:
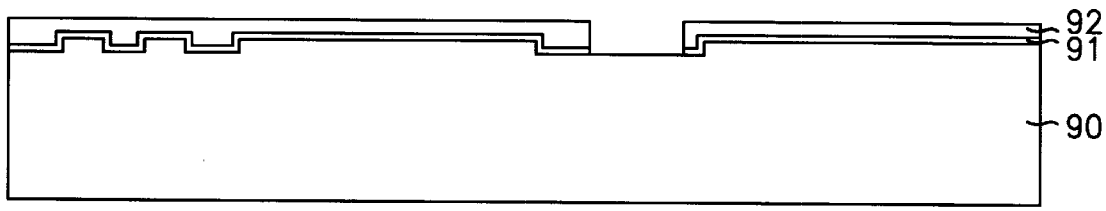
Figure 9D:
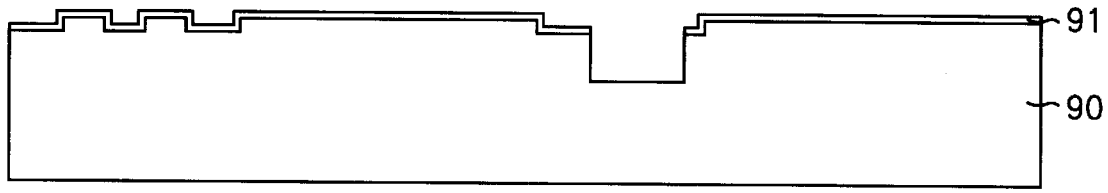
Figure 9E:
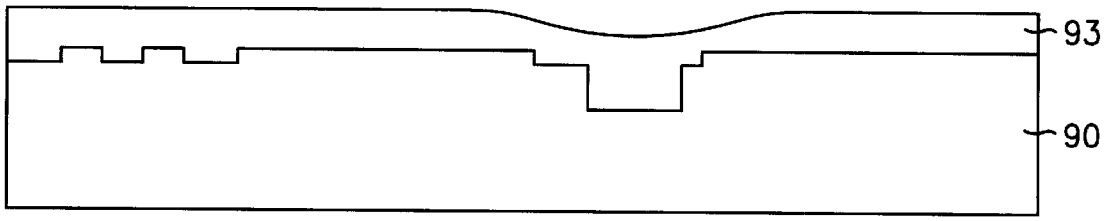
Figure 9F:
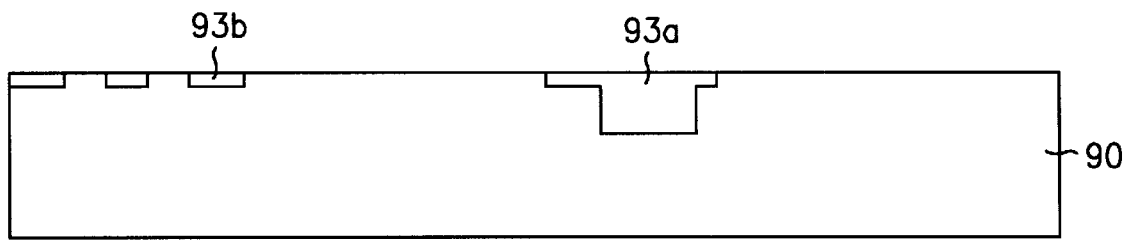
Figure 9G:
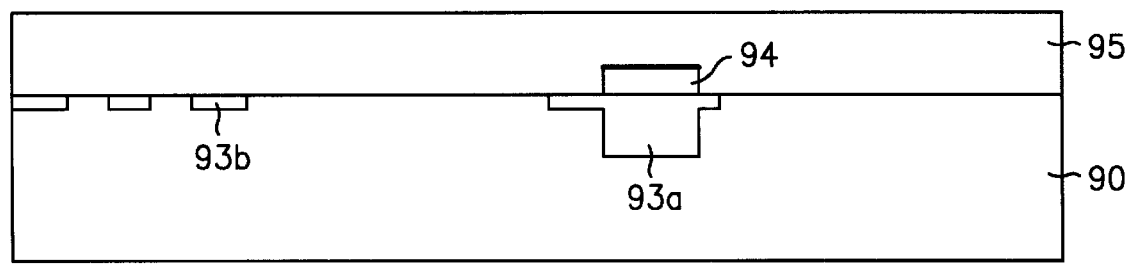
Figure 9H:
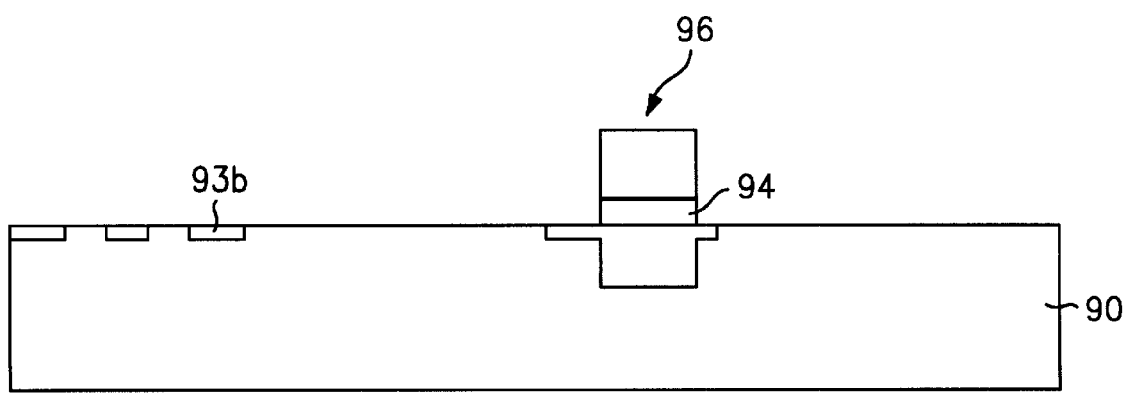
Figure 9L:
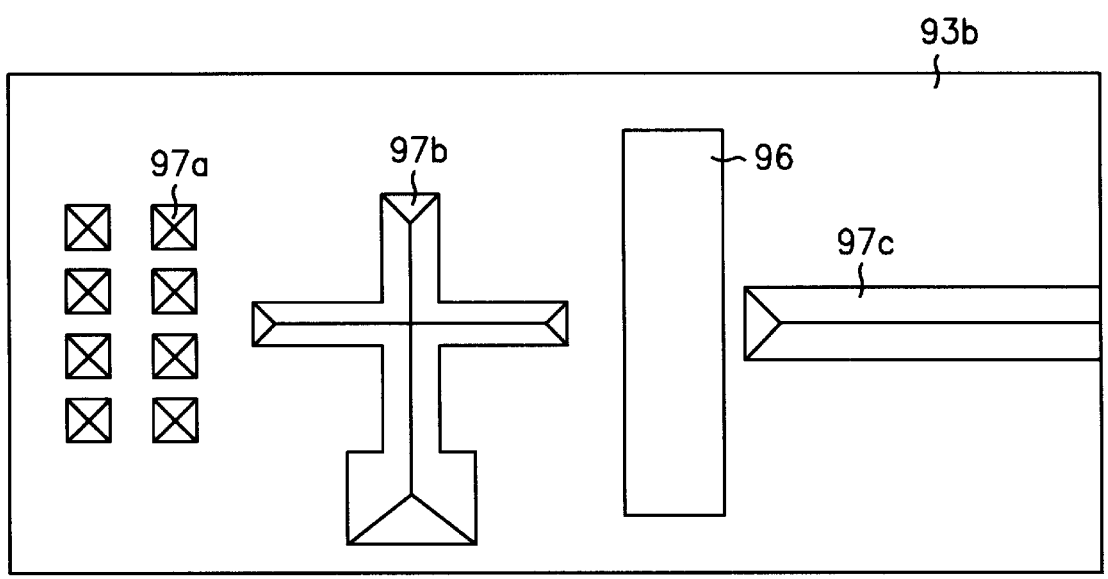
Figure 9M:
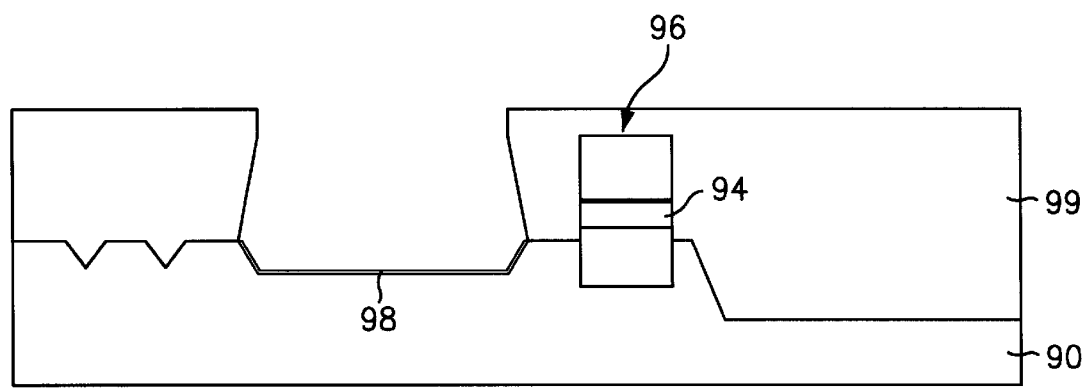
Figure 9N:
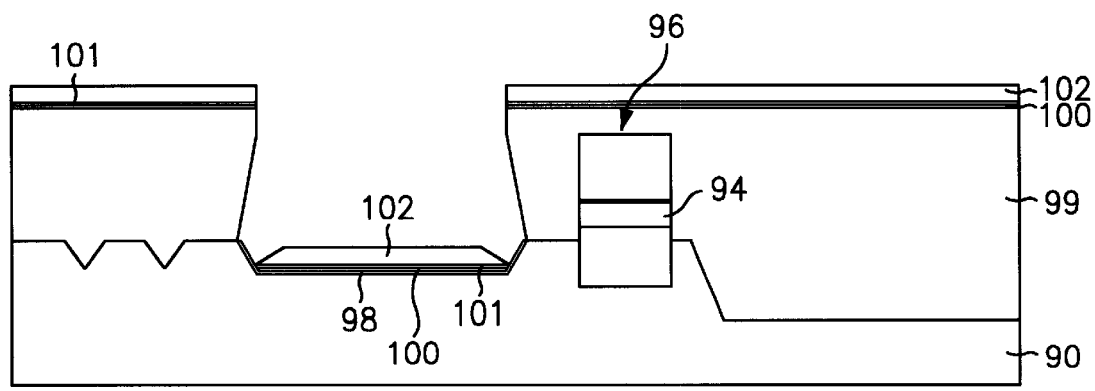
Figure 9O:
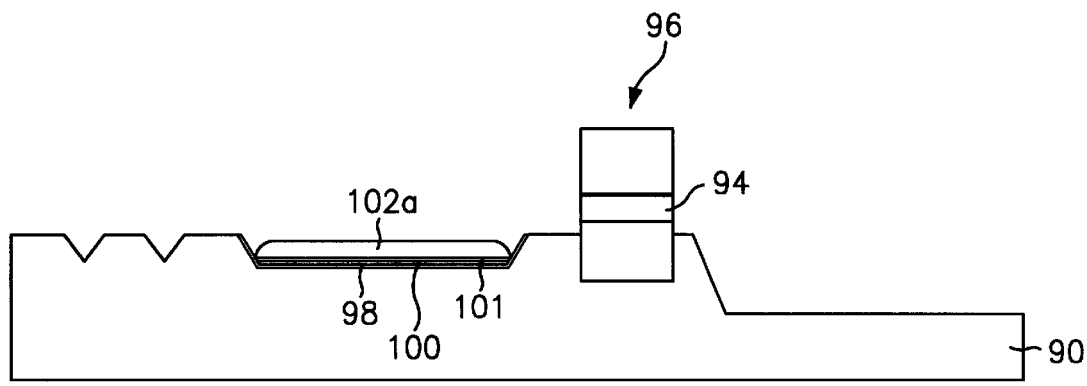
Figure 9P:
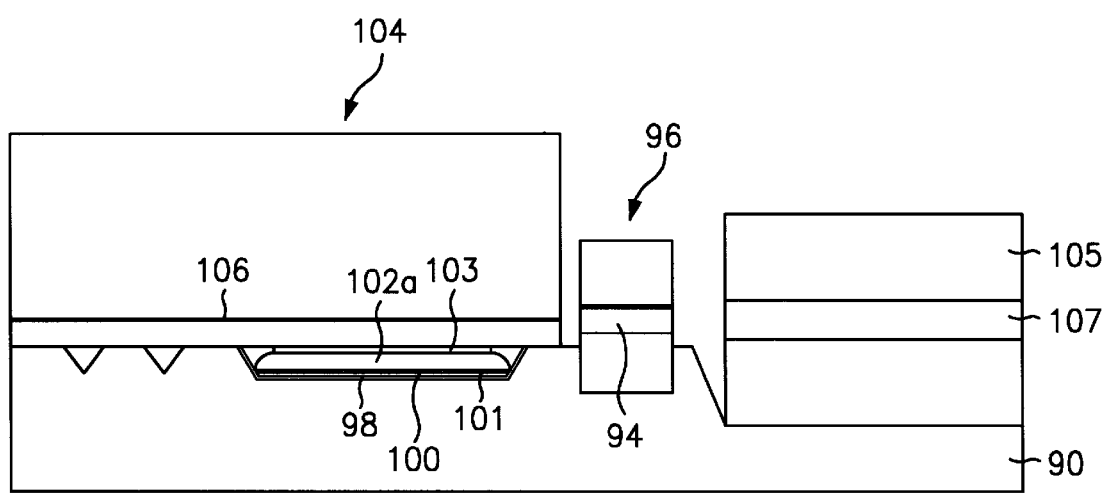

As accompanying drawings of FIGS. 9a to 9p illustrate a method for the passive alignment of a laser diode(LD), a planar lightwave circuit(PLC) and an optical fiber according to the above-described principle of the present invention, the method in accordance with a preferred embodiment of the present invention will be described with reference to the drawings hereinafter.

First, as shown in FIGS. 9a and 9b, a portion of a silicon wafer 90 except portions where etching windows of V-shaped grooves are formed is dry etched in the order of 4 μm by using a method such as a photolithography, a reactive ion etching (RIE) or an inductively coupled plasma (ICP) method. The etching windows of V-shaped grooves (i.e., exposed portions of the silicon substrate) are placed at positions where a first set 90a of V-shaped grooves for use with alignment marks, a second set 90b of V-shaped grooves for solder bumps and electrodes, and a third set 90c of V-shaped grooves for aligning optical fiber will be formed. FIG. 9a is a cross sectional view of FIG. 9b taken along a line 9A—9A.

Thereafter, as shown in FIG. 9c, an Al layer 91 is deposited on top of the substrate as shown in FIG. 9a, and then a photoresist layer 92 is formed on top of the Al layer 91 by using a method such as a spin coating method. After the photoresist layer 92 is patterned into a predetermined configuration to expose a region where a lower clad window is formed, the exposed Al layer 91 is wet etched selectively.

In a subsequent step, after the photoresist layer 92 is removed, the exposed silicon substrate 90 is etched in the thickness of 20 μm by using an ICP method, as shown in FIG. 9d, wherein the Al layer 91 serves as a mask. And then, as shown in FIG. 9e, after removing the Al layer 91, a silica layer 93 is formed on top thereof by using a flame hydrolysis deposition (FHD) method and carried out by a densifying process.

Subsequently, as shown in FIG. 9f, the silica layer 93 is planarized by using a chemical mechanical polishing until top of the silicon substrate 90 is opened, thereby obtaining a lower clad 93a. At the same time, the silica layer 93 is resided on regions of the silicon substrate 90 and serves as a mask 93b.

And then, as shown in FIG. 9g, a PLC core layer 94 is formed by using the FDH method and patterned into a PLC core pattern a silica layer is then provided to form an upper clad layer 95.

In the next step, as shown in FIG. 9h, the silica layer except the PLC region is selectively etched until the mask 93b is exposed, thereby forming a PLC 96. At the same time, the mask 93b obtained at the step of FIG. 9f remains in the silicon substrate 90 and the other region of the silicon substrate 90 is opened.

Thereafter, as shown in FIG. 9i, the opened silicon substrate 90 is dry etched in the order of 4 μm, while the mask 93b remains without being etched. And then, as shown in FIG. 9j, the opened silicon substrate 90 is wet etched by using KOH solution to obtain V-shaped grooves. At the same time, the first set of V-shaped grooves for use as an alignment mark, the second set of V-shaped grooves for solder bumps and electrodes, and the third set of V-shaped grooves for aligning an optical fiber are formed simultaneously. Accompanying FIG. 9k shows a cross sectional view after removing the mask 93b utilized as a mask during the formation of the V-shaped grooves. The mask 93b is facilely removed by using a chemical etchant such as HF solution since the mask 93b is made of a silica layer, however, it does not have an effect on the operation of the PLC 96 because the etching amount thereof is very small. FIG. 9l depicts a plan view of FIG. 9k.

In a subsequent step, a silicon nitride layer 98 is deposited by using a method such as a chemical vapor deposition (CVD) method to insulate electrodes and the silicon substrate 90 and provide a non-adhesive layer which does not stick to the solder bump, as shown in FIG. 9m. And then a planarized photoresist 99 is coated by using a method such as a spin coating in order to form the solder bump by utilizing a lift-off method, and the photoresist 99 is patterned to expose a portion of the silicon substrate 90 on which the second set of V-shaped grooves for solder bumps and electrodes are formed. For the sake of convenience, the silicon nitride layer 98 is depicted only at the portion of the second set of the V-shaped grooves in the drawings.

Subsequently, as shown in FIG. 9n, a Ti layer 100 and a Au layer 101 are deposited in the thickness of 0.3 µm and 0.5 µm, respectively, for serving as an adhesive layer, and a Pb—Sn layer 102 is deposited in the thickness of 6 µm as a solder metal.

In the next step, as shown in FIG. 9o, after removing the remaining photoresist 99 and the deposited metal layers 100, 101 and 102, a solder bump 102a is formed by using a reflow process(see FIGS. 8a to 8c).

And then, as shown in FIG. 9p, after a LD 104 is aligned by using the first set 97a of V-shaped grooves and is clamped by the solder bump 102a, and the optical fiber 105 is mounted on the third set 97c of V-shaped grooves. The reference numeral 103 represents a LD electrode which is electrically connected to the solder bump 102a. And also, the reference numeral 107 represents a core of the optical fiber 105.

In comparison with the conventional passive alignment method, the present invention is simple in the manufacturing process, which, will in turn, be cost-effective.

Even though the present invention has been described only a LD as an optical device in the preferred embodiment, it should be apparent to those skilled in the art that the present invention can be applied other optical device such as a photo diode (PD).

While the present invention has been described with respect to the preferred embodiments, other modifications and variations may be made without departing from the spirit and scope of the present invention as set forth in the following claims.

What is claimed is:

1. A method for aligning an optical device, an optical fiber and a planar lightwave circuit (PLC) with each other by using a passive alignment, the method comprising the steps of:

(a) preparing a silicon substrate provided with an alignment mark region, an electrode region and an optical fiber alignment region and etching a remaining portion of the silicon substrate except those regions in a first preset thickness;

(b) selectively etching a region of the silicon substrate, on which a lower clad layer of a PLC is formed, in a second preset thickness;

(c) forming a silica layer on top of the silicon substrate for forming a lower clad layer of the PLC;

(d) etching back the silica layer, thereby forming the lower clad layer by burying the silica layer in the selectively etched region;

(e) forming and then patterning the core and upper layer of the planar lightwave circuit into a predetermined pattern, thereby providing the PLC;

(f) etching the silicon substrate until a portion of a sidewall of the silica layer buried in the region is exposed;

(g) wet-etching the silicon substrate by using the silica layer as an etching barrier to form a first set of V-shaped grooves for serving as an alignment mark, a second set of V-shaped grooves for aligning solder bumps and a third set of V-grooves for aligning the optical fiber;

(h) forming solder bumps in the second set of V-grooves; and (i) assembling the optical device and the optical fiber on the silicon substrate.

2. The method of claim 1, wherein the step (h) further comprises the steps of:

(h1) providing a non-adhesive layer on the silicon substrate provided with the second set of V-shaped grooves;

(h2) forming on top of the non-adhesive layer a photoresist pattern for use in the formation of the solder bumps;

(h3) forming a Ti layer, a Au layer and a metal layer for solder bumps on the photoresist pattern, sequentially;

(h4) lifting-off the photoresist pattern; and (h5) reflowing the metal layer resided in the second set of V-grooves.

3. The method of claim 1, wherein the step (i) further comprises the step of aligning the optical devices with the silicon substrate by optically contrasting a planarized surface of the silicon substrate and the second set of V-shaped grooves.

4. The method of claim 1, wherein the electrodes of optical device are electrically connected to the solder bumps in the step (i).

* * * * *